United States Patent
Hoshi et al.

(10) Patent No.: US 12,098,039 B2
(45) Date of Patent: Sep. 24, 2024

(54) BODY-TO-BE-CONVEYED, CONTAINER CARRIER, AND CONVEYING DEVICE

(71) Applicant: Hitachi High-Tech Corporation, Tokyo (JP)

(72) Inventors: Ryosuke Hoshi, Tokyo (JP); Yasuaki Aoyama, Tokyo (JP); Satoru Kaneko, Tokyo (JP); Hiroyuki Kobayashi, Tokyo (JP); Takeshi Tamakoshi, Tokyo (JP); Hiroshi Watanabe, Tokyo (JP); Katsuhiro Kambara, Tokyo (JP); Kuniaki Onizawa, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 0 days.

(21) Appl. No.: 17/768,745

(22) PCT Filed: Aug. 19, 2020

(86) PCT No.: PCT/JP2020/031213
§ 371 (c)(1),
(2) Date: Apr. 13, 2022

(87) PCT Pub. No.: WO2021/084849
PCT Pub. Date: May 6, 2021

(65) Prior Publication Data
US 2024/0140735 A1 May 2, 2024

(30) Foreign Application Priority Data
Oct. 28, 2019 (JP) .................................. 2019-195183

(51) Int. Cl.
*B65G 54/02* (2006.01)
*G01N 35/04* (2006.01)

(52) U.S. Cl.
CPC ............. *B65G 54/02* (2013.01); *G01N 35/04* (2013.01); *G01N 2035/0477* (2013.01)

(58) Field of Classification Search
CPC ................... B65G 54/02; G01N 35/04; G01N 2035/0477; H01F 7/06
(Continued)

(56) References Cited

U.S. PATENT DOCUMENTS 6,343,690 B1 * 2/2002 Britton ................. B65G 17/002
198/867.06
8,329,102 B2 * 12/2012 Koike .................... G01N 35/04
422/65
(Continued)

FOREIGN PATENT DOCUMENTS

JP 57-144059 U 9/1982
JP 2014-532870 A 12/2014
(Continued)

OTHER PUBLICATIONS

EP 2977765, Inventor Malinowski, Jan. 27, 2016.*
(Continued)

*Primary Examiner* — Douglas A Hess
(74) *Attorney, Agent, or Firm* — Crowell & Moring LLP (57) ABSTRACT

The weight of a body-to-be-conveyed constituting a conveying device is reduced, and the friction force between the sliding surface of the body-to-be-conveyed and the conveyance path is reduced. A body-to-be-conveyed that is a component of a conveying device that uses electromagnetic force as thrust and can move in a horizontal direction includes a mover in which a bottom surface is arranged so that a predetermined gap is formed in a vertical direction with respect to the sliding surface thereof, in which the mover includes a permanent magnet and a cover, a gap facing surface of the permanent magnet facing the gap (Continued)

includes one magnetic pole, the cover is installed on a side of the permanent magnet opposite from the gap facing surface in the vertical direction, the horizontal outermost diameter of the cover is larger than the horizontal outermost diameter of the permanent magnet, and the cover is formed of a flat plate.

17 Claims, 7 Drawing Sheets

(58) Field of Classification Search
USPC .......................................................... 198/619
See application file for complete search history.

(56) References Cited

U.S. PATENT DOCUMENTS

| | | | | |
|---|---|---|---|---|
| 8,785,538 | B2* | 7/2014 | Kim | B82Y 30/00 |
| | | | | 524/495 |
| 9,664,703 | B2* | 5/2017 | Heise | B65G 54/02 |
| 10,564,170 | B2* | 2/2020 | Schneider | B65G 54/02 |
| 11,619,641 | B2* | 4/2023 | Benedetti | G01N 35/04 |
| | | | | 422/65 |
| 11,709,171 | B2* | 7/2023 | Kopp | G01R 33/0035 |
| | | | | 422/63 |
| 11,754,558 | B2* | 9/2023 | Chang | G01R 33/30 |
| | | | | 436/526 |
| 11,887,780 | B2* | 1/2024 | Aoyama | G01N 35/028 |
| 2014/0234065 | A1 | 8/2014 | Heise et al. | |
| 2017/0131310 | A1 | 5/2017 | Volz et al. | |
| 2018/0128848 | A1 | 5/2018 | Schneider et al. | |

FOREIGN PATENT DOCUMENTS

| | | |
|---|---|---|
| JP | 2017-522565 A | 8/2017 |
| JP | 2018-520344 A | 7/2018 |
| WO | WO 2019/170488 A1 | 9/2019 |

OTHER PUBLICATIONS

WO 2020/001750 A1, Inventor Ehmann, Jan. 2, 2020.*
International Search Report (PCT/ISA/210) issued in PCT Application No. PCT/JP2020/031213 dated Oct. 27, 2020 with English translation (five (5) pages).
Japanese-language Written Opinion (PCT/ISA/237) issued in PCT Application No. PCT/JP2020/031213 dated Oct. 27, 2020 (four (4) pages).
International Preliminary Report on Patentability (PCT/IB/338 & PCT/IPEA/409) issued in PCT Application No. PCT/JP2020/031213 dated Jul. 14, 2021 (three (3) pages).

* cited by examiner

BODY-TO-BE-CONVEYED, CONTAINER CARRIER, AND CONVEYING DEVICE

TECHNICAL FIELD

The present invention relates to a body-to-be-conveyed, a container carrier, and a conveying device.

BACKGROUND ART

In a specimen analysis system that analyzes biological samples (hereinafter referred to as "specimens") such as blood, plasma, serum, urine, and other body fluids, in order to inspect the designated analysis items for each specimen, devices having a plurality of functions are connected and each process is automatically processed. In other words, in the specimen analysis system, analysis units in a plurality of analysis fields such as biochemistry and immunity are connected by a conveyor line, and a plurality of analyses are performed collectively.

There are two types of conveying methods for the conveyor line: (1) a method using a belt conveyor and (2) a method using electromagnetic attractive force for thrust.

In the method (2) above, a permanent magnet is provided in a container carrier such as a holder for holding a specimen, and an electromagnetic attractive force generated by supplying a current to the winding of an electromagnetic circuit provided on the transfer surface is used as a thrust of the container carrier. In this case, in the structure in which only the permanent magnet is provided in the container carrier, the magnetic flux leaking into the space increases, and thus, an attempt is made to reduce the leakage flux and improve the thrust.

For example, JP-A-2017-522565 (PTL 1) discloses a sample container carrier for a laboratory sample distribution system in which a permanent magnet is disposed on a sliding member and a cover made of soft magnetic material is disposed on the permanent magnet, wherein the cover has a portion (side surrounding portion) surrounding the side of the permanent magnet.

CITATION LIST

Patent Literature

PTL 1: JP-A-2017-522565

SUMMARY OF INVENTION

Technical Problem

In the sample container carrier described in PTL 1, since the cover surrounds the side of the permanent magnet, the cover serves as a supplementary pole of the permanent magnet and the effects of reducing the leakage flux and increasing the permeance between the permanent magnet and the electromagnetic circuit are obtained.

However, since the mass of the sample container carrier described in PTL 1 increases by the amount of the side surrounding portion, there is room for improvement in that the friction force at the portion where the sample container carrier comes into contact with the transfer surface increases.

An object of the present invention is to reduce the weight of a body-to-be-conveyed constituting a conveying device and to reduce the friction force between the sliding surface of the body-to-be-conveyed and the conveyance path.

Solution to Problem

The present invention provides a body-to-be-conveyed that is a component of a conveying device that uses electromagnetic force as a thrust and can move in a horizontal direction, the body-to-be-conveyed including a mover in which a bottom surface is arranged so that a predetermined gap is formed in a vertical direction with respect to a sliding surface thereof, in which the mover includes a permanent magnet and a cover, a gap facing surface of the permanent magnet facing the gap includes one magnetic pole, the cover is installed on a side of the permanent magnet opposite from the gap facing surface in the vertical direction, the horizontal outermost diameter of the cover is larger than the horizontal outermost diameter of the permanent magnet, and the cover is formed of a flat plate.

Advantageous Effects of Invention

According to the present invention, the weight of a body-to-be-conveyed constituting a conveying device can be reduced, and the friction force between the sliding surface of the body-to-be-conveyed and the conveyance path can be reduced.

DESCRIPTION OF EMBODIMENTS

The present invention relates to a body-to-be-conveyed, a container carrier, and a conveying device. The conveying device is suitably used for a specimen analysis system, a specimen pretreatment device that performs pretreatment necessary for analysis, and the like.

Hereinafter, embodiments of the present invention will be described with reference to the drawings. The present invention is not limited to the embodiments and it is sufficient that the desired effect of the present invention can be obtained even if the shape, arrangement, and other configurations are changed.

Figure 1:
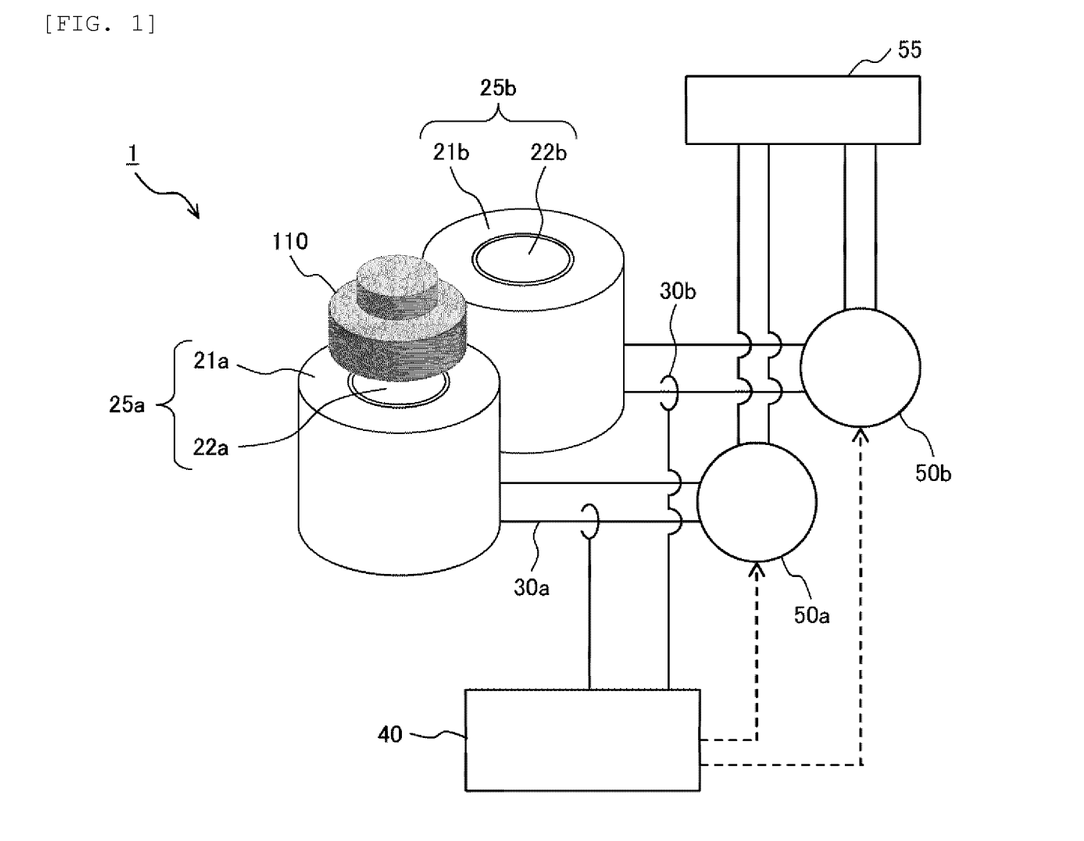
FIG. 1 is a schematic configuration diagram showing a conveying device according to an embodiment.

FIG. 1 is a schematic configuration diagram showing a conveying device according to an embodiment.

As shown in this drawing, a conveying device 1 includes a plurality of electromagnets 25a and 25b, drive circuits 50a and 50b, current detection units 30a and 30b, a calculation unit 40, and a power supply 55. The electromagnet 25a includes a core 22a made of a magnetic material and a winding 21a wound around the outer peripheral portion of the core 22a. Similarly, the electromagnet 25b includes a core 22b and a winding 21b. The cores 22a and 22b have a columnar shape.

A container carrier 110 is movably placed on the upper surface (upper part) of the electromagnets 25a and 25b. The container carrier 110 contains a permanent magnet (not shown). The container carrier 110 is an object to be conveyed (body-to-be-conveyed). Here, the "upper part" refers to a portion that becomes a high portion in the vertical direction when the member is installed by a normal installation method. In the case of the electromagnets 25a and 25b shown in the drawing, since the upper part is flat, the upper parts of the electromagnets 25a and 25b are referred to as "upper surface".

Neodymium alloy, ferrite, or the like is preferably used as the permanent magnet of the container carrier 110. In some cases, a soft magnetic material or the like may be used instead of the permanent magnet.

Examples of the container carrier 110 include a specimen holder that holds such as a test tube containing a liquid specimen and a specimen vessel for a sample cell, and a specimen rack that holds a plurality of specimen vessels.

The windings 21a and 21b of the electromagnets 25a and 25b are connected to the drive circuits 50a and 50b, respectively. The electromagnets 25a and 25b generate a magnetic field by the voltage applied by the drive circuits 50a and 50b, respectively. The magnetic field is generated upward from the upper ends of the cores 22a and 22b. These magnetic fields generate thrust in the permanent magnets of the container carrier 110.

The current detection units 30a and 30b have a function of detecting currents flowing through the windings 21a and 21b of the electromagnets 25a and 25b, respectively, and sending the current values to the calculation unit 40. The calculation unit 40 outputs a control signal for moving the container carrier 110 by using the detected current value or the like. As a result, the container carrier 110 can be conveyed to a desired position. The current detection units 30a and 30b may be those that measure the voltage of the series resistance, those that use a current transformer, those that use a Hall current sensor, and the like but are not limited thereto.

The calculation unit 40 calculates the relative positional relationship between the core 22 and the container carrier 110 based on the current values and the like detected by the current detection units 30a and 30b and calculates the position of the container carrier 110 in the conveying device 1. Further, the calculation unit 40 uses the calculated position information of the container carrier 110 to determine the amount of current required for driving the container carrier 110 and the timing of supplying the current.

The power supply 55 is connected to the drive circuits 50a and 50b. The power supply 55 may be alternating current or direct current. In the case of direct current, a battery may be used.

Figure 2A:
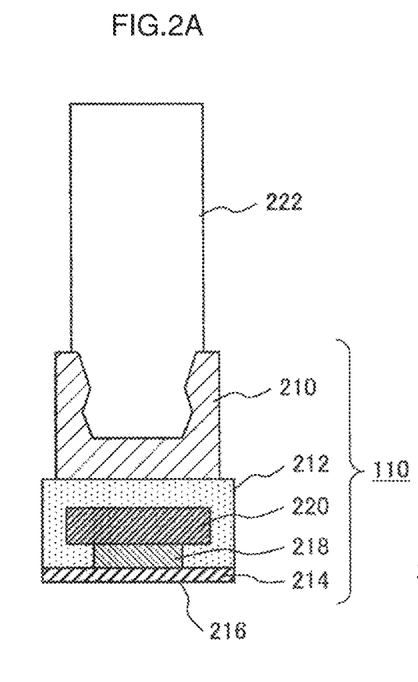
FIG. 2A is a cross-sectional view showing a container carrier according to the embodiment.

FIG. 2A is a cross-sectional view showing the container carrier according to the embodiment.

In the drawing, the container carrier 110 is composed of a container holder 210 and a carrier base 212. A specimen vessel 222 is inserted into and fixed to the container holder 210.

The carrier base 212 is provided with a columnar permanent magnet 218 and a cover 220. The cover 220 is installed on the upper surface of the permanent magnet 218. The cover 220 has a larger diameter (outer diameter) than the permanent magnet 218. The cover 220 is preferably made of a soft magnetic material. As the soft magnetic material, magnetic stainless steel, S45C, or the like is preferably used. Further, the cover 220 is preferably installed to be in direct contact with the upper surface of the permanent magnet 218.

Further, the carrier base 212 includes a sliding unit 214. The sliding unit 214 is adapted to be in contact with the electromagnets 25a and 25b of FIG. 1 on the sliding surface 216. Therefore, the sliding surface 216 is a bottom surface of the container carrier 110 (body-to-be-conveyed) and is a portion that comes into contact with the conveyance path of the conveying device.

The permanent magnet 218 and the cover 220 are collectively referred to as a "mover". The sliding unit 214 is provided at the lower part of the mover. The sliding unit 214 is a member that generates a "gap" described later between the mover and the electromagnets 25a and 25b in FIG. 1. Therefore, a bottom surface of the mover is arranged at a position higher in the vertical direction than the bottom surface of the body-to-be-conveyed. A gap facing surface of the permanent magnet 218 facing the gap has one magnetic pole. The other magnetic pole of the permanent magnet 218 is in contact with the cover 220. The cover 220 is installed on the side of the permanent magnet 218 opposite from the gap facing surface in the vertical direction.

Figure 2B:
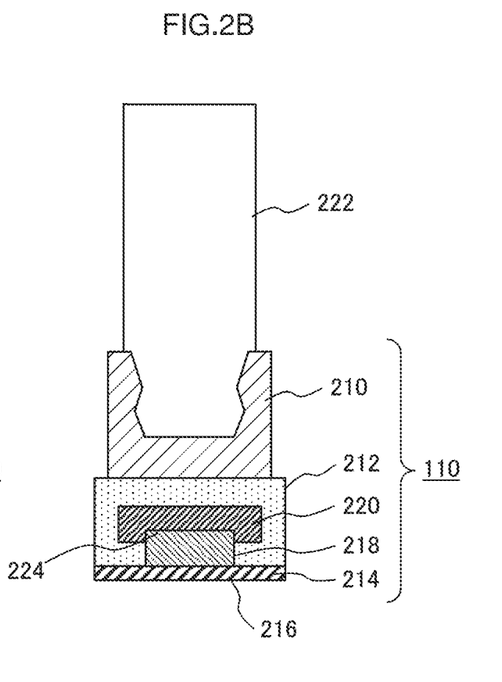
FIG. 2B is a cross-sectional view showing a container carrier according to a variation of the embodiment.

In this drawing, the cover 220 has a flat plate shape and has a configuration in which the permanent magnet 218 is attached to the lower surface thereof. However, as illustrated in FIG. 2B, a configuration may be provided in which a recess (recess) 224 is provided on the surface of the cover 220 on the gap side and a part of the permanent magnet 218 is embedded in the recess 224. The vertical dimension (depth) of the recess 224 is smaller than the vertical dimension (height) of the permanent magnet.

Figure 3:
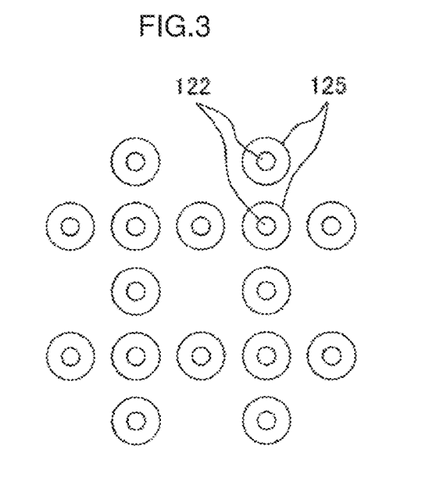
FIG. 3 is a top view showing an arrangement of electromagnets in a conveyance path of the conveying device according to the embodiment.

FIG. 3 is a top view showing the arrangement of electromagnets in the conveyance path of the conveying device according to the embodiment.

As shown in this drawing, a plurality of electromagnets 125 are arranged in the conveyance path of the container carrier. Each electromagnet 125 includes a core 122. The electromagnets 125 are arranged in a grid pattern. As a result, the direction in which the container carrier moves can be freely controlled in the front-back and left-right directions.

Next, the effect of the presence or absence of a side surrounding portion will be described. In the following description, the strength of the magnetic pole (magnetic charges) of the permanent magnets of Examples 1 to 3 and Comparative Examples are assumed to be the same.

Figure 4A:
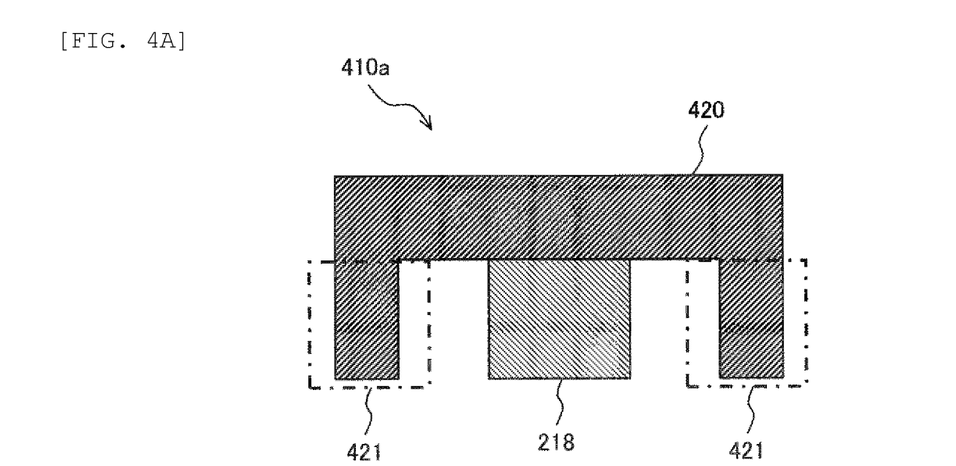
FIG. 4A is a schematic cross-sectional view showing a mover of Comparative Example.

FIG. 4A is a cross-sectional view showing a mover of Comparative Example.

The mover 410a shown in the drawing is provided at the carrier base of the container carrier and includes the permanent magnet 218 and a cover 420 thereof. The cover 420 is fixed to the upper surface of the permanent magnet 218. The cover 420 is larger in diameter than the permanent magnet 218 and has a side surrounding portion 421. The side surrounding portion 421 covers the periphery (side) of the permanent magnet 218. The outer diameter of the side surrounding portion 421 is the same as the outer diameter of the upper part of the cover 420. The cover 420 is made of a soft magnetic material. Since the cover 420 has the side surrounding portion 421, the leakage flux can be reduced.

Figure 4B:
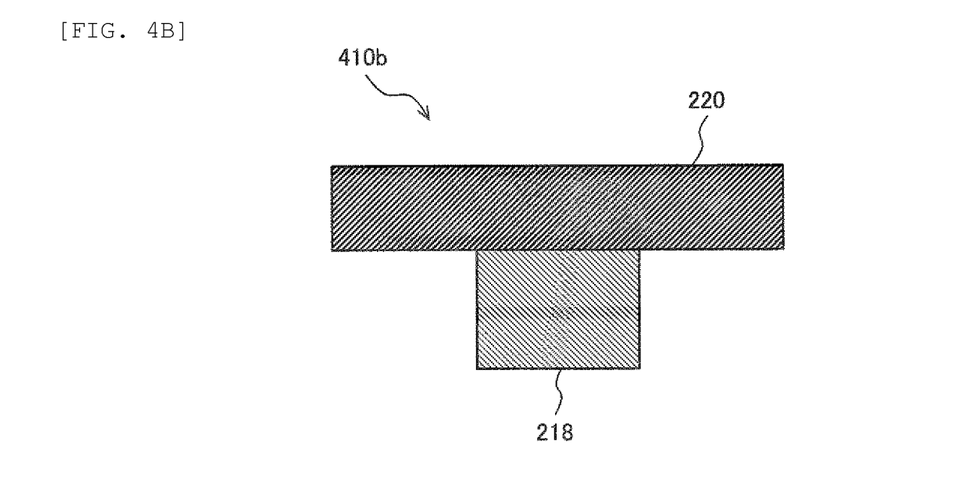
FIG. 4B is a schematic cross-sectional view showing a mover of Example 1.

FIG. 4B is a cross-sectional view showing the mover of Example 1.

A mover 410b shown in the drawing includes the permanent magnet 218 having the same shape as that of FIG. 4A and the cover 220 thereof. The cover 220 is disc-shaped and has no side surrounding portion.

The cover 220 has a larger diameter than the permanent magnet 218. The cover 220 is made of soft magnetic material and is fixed to the upper surface of the permanent magnet 218. When the diameter of the cover 220 is smaller than the diameter of the permanent magnet 218, the leakage flux increases and the magnetic flux contributing to the thrust decreases, so that the thrust decreases. Therefore, it is desirable that the diameter of the cover 220 is larger than the diameter of the permanent magnet 218.

In the present example, the shape of the cover 220 is a disc shape, but the shape of the cover is not limited to the present example and may be, for example, a square, an ellipse, or a rhombus.

Figure 5A:
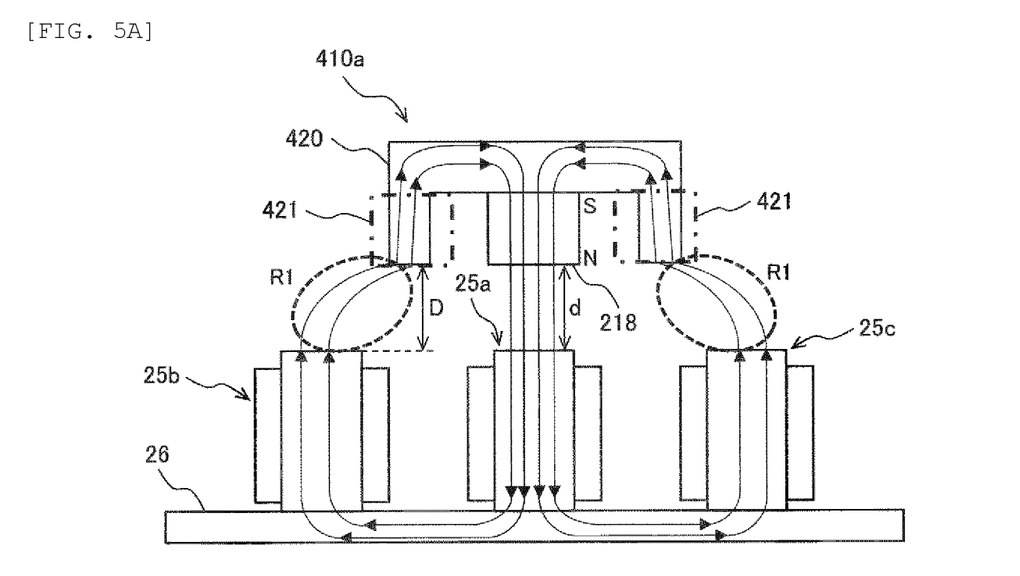
FIG. 5A is a schematic diagram showing a magnetic flux distribution generated by a permanent magnet of the mover according to Comparative Example.

FIG. 5A is a schematic diagram showing the magnetic flux distribution generated by the permanent magnet of the mover of Comparative Example.

The mover 410a in the drawing is the same as that shown in FIG. 4A. That is, the cover 420 has a side surrounding portion 421.

The mover 410a is placed on a conveyance path including electromagnets 25a, 25b, and 25c via a sliding unit (not shown). The electromagnets 25a, 25b, and 25c are installed on the upper surface of a yoke 26. Although the present drawing is a cross-sectional view, the electromagnets are arranged adjacent to each other in front of and behind the electromagnet 25a (the back side and the front side of the drawing).

The distance D between the lower surface of the side surrounding portion 421 and the upper surface of the electromagnet 25a is equal to the distance d between the lower surface of the permanent magnet 218 and the upper surface of the electromagnet 25a. Here, the distances D and d are defined as the distances when it is assumed that the upper surface and the lower surface are both parallel planes. The distance d is provided by the sliding unit 214 of FIG. 2A.

Figure 5B:
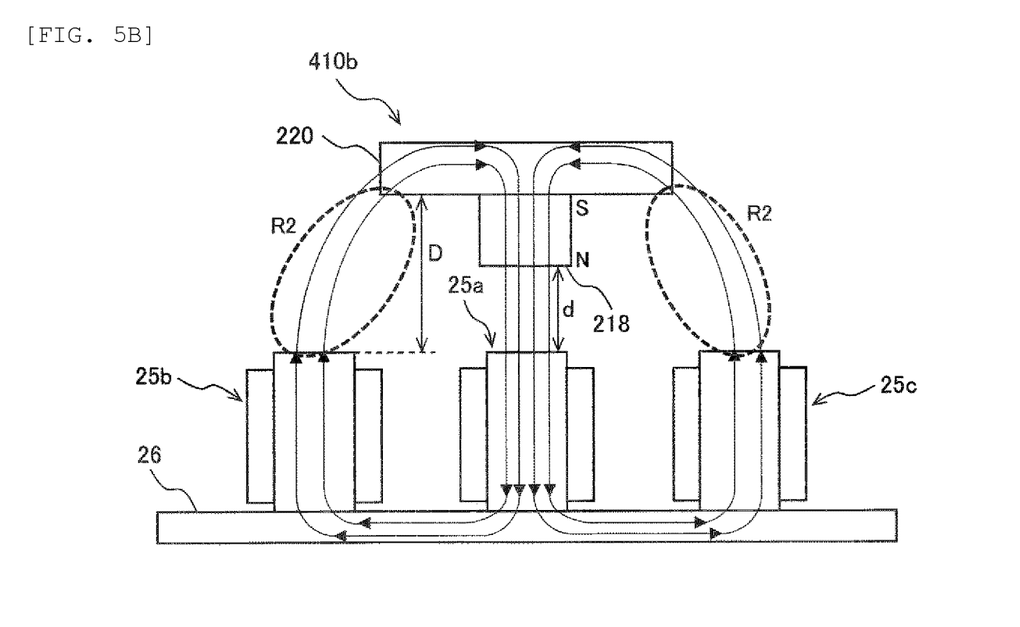
FIG. 5B is a schematic diagram showing a magnetic flux distribution generated by a permanent magnet of the mover according to Example 1.

FIG. 5B is a schematic diagram showing the magnetic flux distribution generated by the permanent magnet of the mover of Example 1.

The mover 410b in the drawing is the same as that shown in FIG. 4B. That is, the cover 220 does not have a side surrounding portion. Therefore, the distance d is equal to that of FIG. 5A, but the distance D is larger than that of FIG. 5A. The electromagnet 25a is closest to the mover 410a or 410b among the plurality of electromagnets 25a, 25b, and 25c.

In FIGS. 5A and 5B, the magnetic flux emitted from the permanent magnet 218 enters the nearby electromagnet 25a via the gap with the distance d, passes through the yoke 26, and enters the electromagnets 25b, 25c, and an adjacent electromagnet (not shown), which are arranged in the circumferential direction of the electromagnet 25a, passes through the cover 420 of the mover 410a or the cover 220 of the mover 410b via the gap with the distance D, and returns to the permanent magnet 218. That is, the magnetic flux generated by the permanent magnet 218 passes through the electromagnet 25a and then is dispersed in the four surrounding electromagnets.

At this time, the magnetoresistance R1 of the gap surrounded by the ellipse in FIG. 5A is smaller than the magnetoresistance R2 of the gap surrounded by the ellipse in FIG. 5B. This is because the magnetoresistance is reduced by the side surrounding portion 421 of the cover 420.

However, as described above, since the magnetic flux is dispersed in the four electromagnets around the electromagnet 25a, the contribution of the magnetoresistance R1 or R2 is ¼ (quarter) in the entire magnetic circuit. Therefore, the influence of the side surrounding portion 421 of the cover 420 shown in FIG. 5A on the magnetoresistance is also ¼. Therefore, it can be understood that the influence of the side surrounding portion 421 on the thrust characteristics is relatively small.

Therefore, even in the case of the cover 220 having no side surrounding portion as shown in FIG. 5B, the influence on the characteristics of the magnetic circuit can be reduced depending on the conditions. As a result, the mass can be reduced, the friction force can be reduced, and the thrust characteristics can be improved, as in the case of the mover 410b. Further, this makes it possible to simplify the structure of the cover 220 and reduce the cost.

Figure 6:
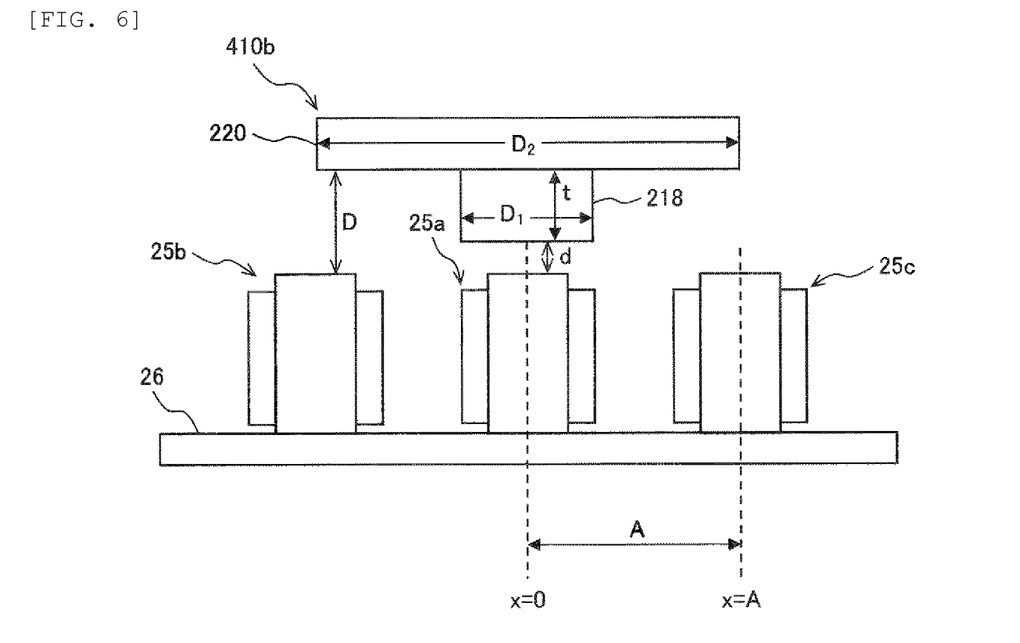
FIG. 6 is a cross-sectional view showing dimensions and the like of the mover of FIG. 5B.

FIG. 6 shows in more detail the dimensions of the mover 410b of FIG. 5B, the gap between the mover 410b and the electromagnets 25a, 25b, and 25c, and the like.

In FIG. 6, in addition to the distances D and d, the diameter $D_1$ of the permanent magnet 218, the height t of the permanent magnet 218, the outer diameter $D_2$ of the cover 220, and the pitch A between the adjacent electromagnets are shown. In other words, A indicates the pitch of the central axes of the adjacent electromagnets.

In the drawing, the gap (distance d) between the mover 410b and the electromagnet 25a is half that of FIG. 5B. When the distance d is shortened, the force that attracts the permanent magnet 218, which does not depend on the electric current, to the nearby electromagnet 25b or 25c, that is, the detent increases. In other words, the detent is the force acting on the permanent magnet when the current is 0 (when it is not energized).

In FIG. 6, when the mover 410b is moved in the x positive direction from x=0 directly above the electromagnet 25a by flowing a current of 1.0 p.u. through the electromagnet 25c and generating a force to attract the mover 410b, in the region of 0<x<A/2, in addition to the attractive force to the mover 410b due to the current, the detent acts as a force for pulling the mover 410b into the nearby electromagnet 25a, and thus, the detent is a force opposite to the x positive direction, which is the traveling direction. Therefore, the attractive force due to the current flowing through the electromagnet 25c is reduced due to the detent.

On the other hand, when the mover 410b is in the region of A/2<x<A, the detent acts as a force for pulling the mover 410b into the electromagnet 25c, and thus, the detent acts in the same direction as the x positive direction, which is the traveling direction. Therefore, a detent is added to the attractive force due to the current of the electromagnet 25c, and the thrust increases. At this time, if the distance d is reduced, the detent increases, and thus, the total thrust including the detent may decrease locally in the region of $0<x<A/2$.

Here, the dimensions of Examples 1 to 3 will be described with reference to FIG. 6.

When the radius of the cover 420 is larger than the pitch A between the adjacent electromagnets 25, the specimens come into contact with each other and adversely affect the driving. Therefore, it is desirable to satisfy the following inequality (1).

$$D_2/2 < A \quad (1)$$

The above inequality (1) is satisfied in Examples 1 to 3.

Further, when the diameter $D_1$ of the magnet becomes 1.5 times the pitch A, magnetic interference occurs with the teeth in the direction opposite to the conveyance direction, and the thrust decreases. Therefore, it is desirable that the following inequality (2) is satisfied.

$$0 < D_1/A \leq 1.5 \quad (2)$$

The above inequality (2) is satisfied in Examples 1 to 3.

Further, when the outer diameter $D_2$ of the cover is equal to or less than the diameter $D_1$ of the magnet, the leakage flux increases, and the magnetic flux contributing to the thrust decreases. Therefore, it is desirable to satisfy the following inequality (3).

$$1.0 < D_2/D_1 \quad (3)$$

The above inequality (3) is satisfied in Examples 1 to 3.

Figure 7A:
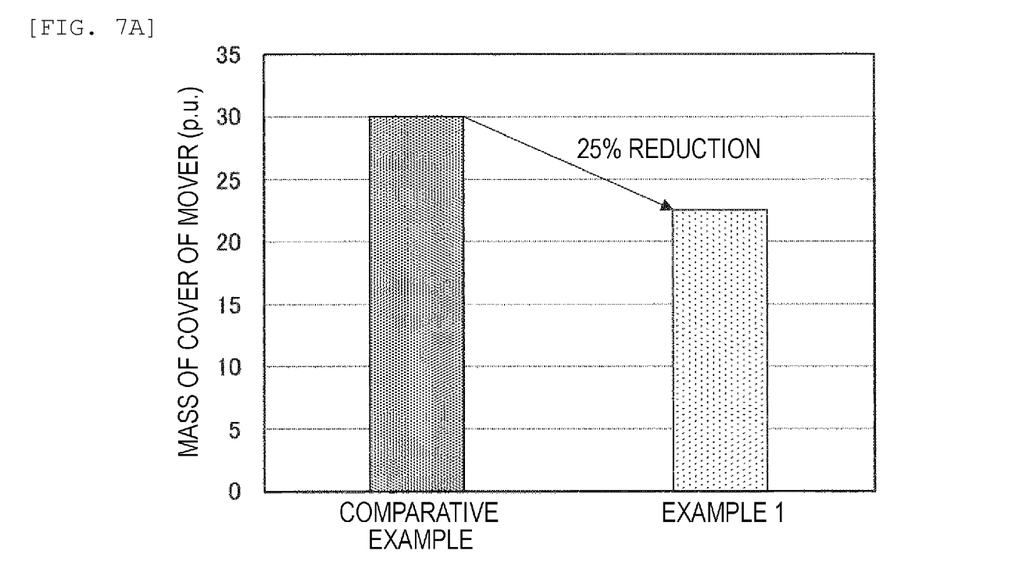
FIG. 7A is a graph showing the masses of the covers of the movers of Comparative Example and Example 1 in comparison.

FIG. 7A is a graph showing the masses of the covers of the movers of Comparative Example and Example 1 in comparison.

In the graph of the drawing, the mass of the cover is shown. In other words, it is a comparison of the masses of the covers constituting the movers.

As shown in the drawing, the mass of the cover of Example 1 can be reduced by 25% as compared with Comparative Example.

Figure 7B:
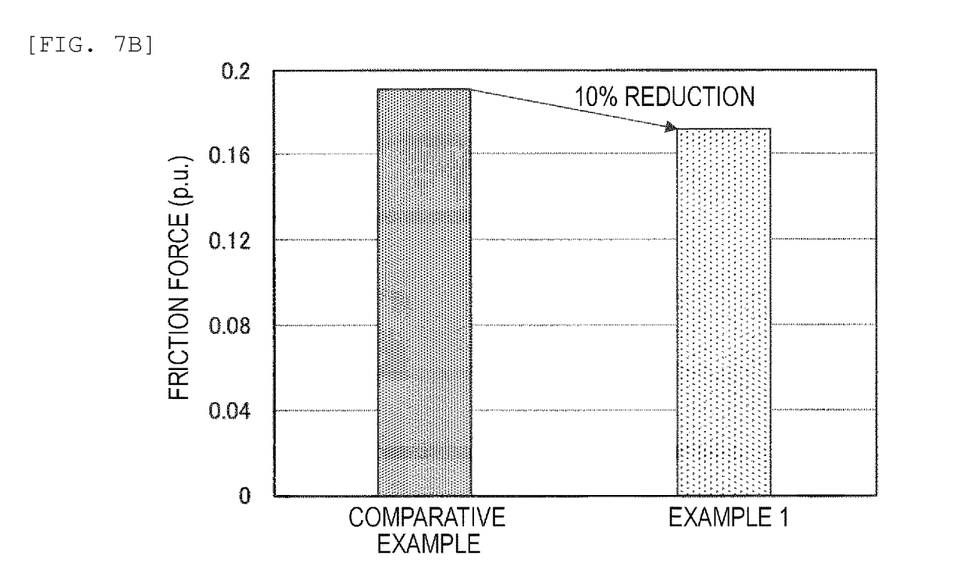
FIG. 7B is a graph comparing the static friction forces of the movers of Comparative Example and Example 1.

FIG. 7B is a graph comparing the static friction forces when the movers of Comparative Example and Example 1 are installed directly above the electromagnet 25a of FIG. 1.

The installation conditions for comparison are that the mover is fixed to a flat plate having the same dimensions as the sliding unit 214 of FIG. 2A and installed directly above the electromagnet, and the static friction force is measured.

As shown in FIG. 7B, the static friction force of Example 1 can be reduced by 10% as compared with Comparative Example.

Compared with Comparative Example, the present example can not only reduce the mass and the friction force but also has a simple cover structure and is easy to manufacture. Therefore, the material cost and the manufacturing cost can be reduced.

Figure 8:
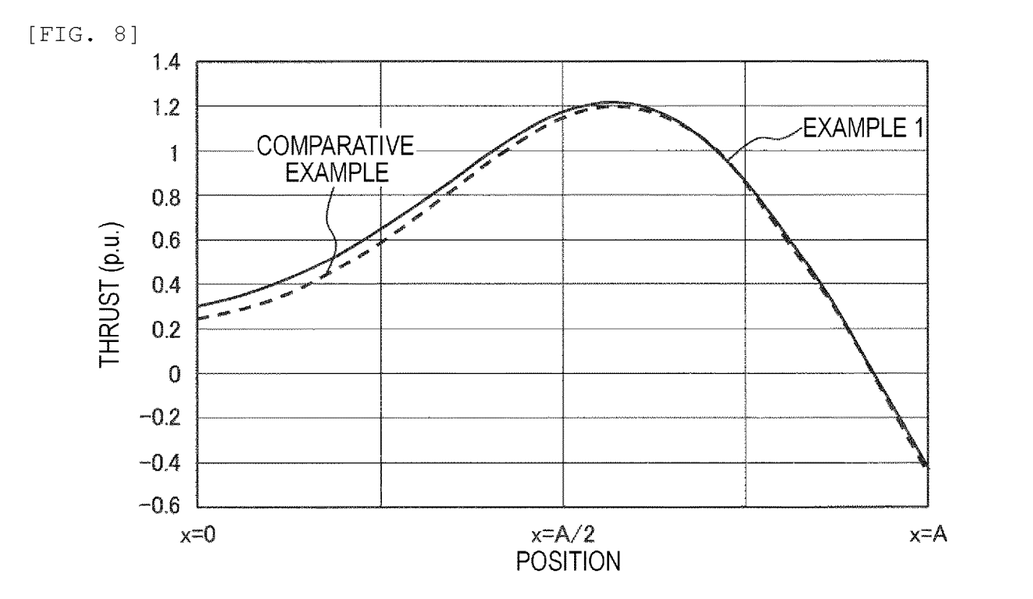
FIG. 8 is a graph showing thrust characteristics of the movers of Comparative Example and Example 1.

FIG. 8 is a graph showing the thrust characteristics when a current is applied to the electromagnet 25c of FIG. 6 to drive the mover. The horizontal axis represents the position x of the central axis of the mover, and the vertical axis represents the thrust. The dashed curved line is Comparative Example, and the solid curved line is Example 1. Here, the thrust means a component force in the horizontal direction among the electromagnetic forces (electromagnetic forces) acting on the mover.

As shown in the drawing, each curved line has a positive slope in the range of x from 0 to about 0.6A and a negative slope in the range of x from about 0.6A to A. In each curved line, the maximum value of thrust is about 1.2.

In Example 1, the thrust is slightly larger in the range where x is in the range of 0 to about 0.5A, as compared with Comparative Example. At x=0, Example 1 has a thrust of about 0.3 and Comparative Example has a thrust of about 0.25. On the other hand, in the range of x from about 0.5A to A, the difference in thrust between Example 1 and Comparative Example is small. However, the difference in thrust between Example 1 and Comparative Example is small in the entire range.

Figure 9:
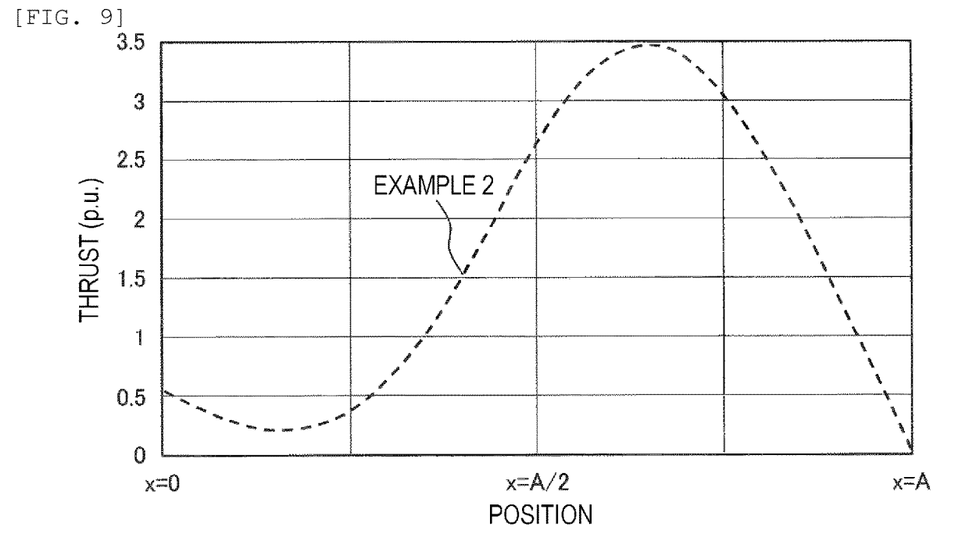
FIG. 9 is a graph showing thrust characteristics of the mover of Example 2.

FIG. 9 is a graph showing the thrust characteristics of the mover according to Example 2. The horizontal axis represents the position x of the central axis of the mover, and the vertical axis represents the thrust.

As shown in the drawing, in the case of Example 2, the slope is negative in the range of x from 0 to about 0.2A, and the slope is positive in the range of x from about 0.2A to about 0.7A. The minimum value of thrust in the range of x from 0 to 0.7A is about 0.2. The slope is negative in the range of x from about 0.7A to about A. The maximum value of thrust is about 3.5.

Therefore, in Example 2, there is a range in which the thrust is smaller than that in Example 1 and there is also a range in which the thrust is about three times that in Example 1. Therefore, in the range where the thrust is small, the moving speed of the mover decreases and there is a possibility that the mover vibrates or the mover stops between the electromagnets. Further, in the case of Example 2, it is easily affected by the friction force in the range where the thrust is small.

When the distance d is reduced as in Example 2, the detent increases because the outer diameter $D_1$ of the permanent magnet 218 is smaller than the pitch A and the gap permeance between the permanent magnet 218 and the nearby electromagnet 25 increases locally. To solve this problem, the outer diameter $D_1$ of the permanent magnet 218 may be made larger than the pitch A between the electromagnet 25a and the electromagnet 25b. This makes it possible to smooth the gap permeance distribution between the permanent magnet 218 and two adjacent electromagnets, for example, the electromagnet 25a and the electromagnet 25c.

Figure 10:
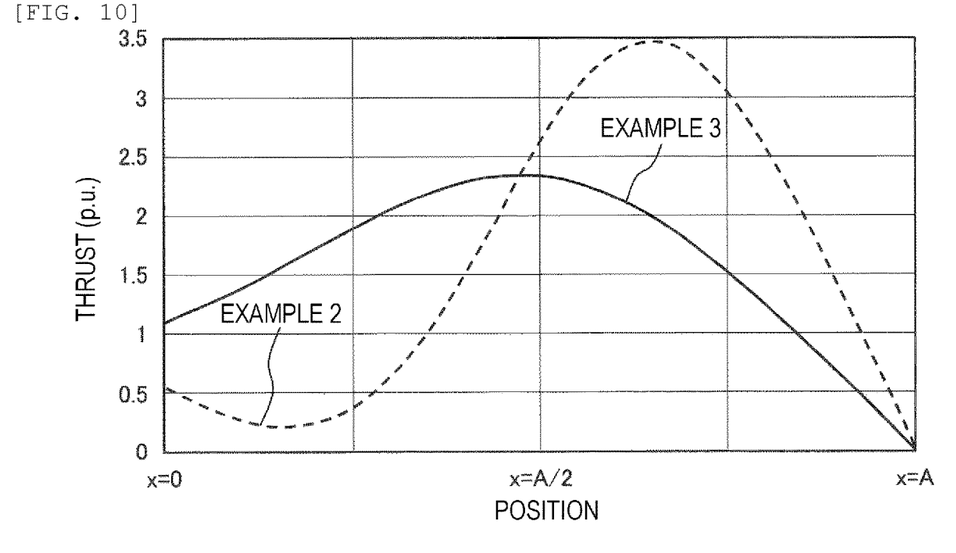
FIG. 10 is a graph showing thrust characteristics of the movers of Examples 2 and 3.

FIG. 10 is a graph showing the thrust characteristics of the mover according to Example 3. The horizontal axis represents the position x of the central axis of the mover, and the vertical axis represents the thrust. The solid curved line is Example 3. For comparison, Example 2 is also shown in a broken curved line.

Compared with Example 2, in Example 3, the diameter $D_1$ of the permanent magnet 218 is 2.5 times larger.

As shown in the drawing, in the case of Example 3, the slope is positive in the range of x from 0 to about 0.5A, and the slope is negative in the range of x from about 0.5A to A. The maximum value of thrust is about 2.3.

In Example 3, the maximum value of thrust is smaller than that in Example 2, but the thrust in the range of x from 0 to about 0.5A is large, and the change in thrust due to the change in x is small.

By making $D_1$ larger than the pitch A, the detent can be reduced and the local decrease in thrust can be reduced. The reduced detent reduces the maximum instantaneous thrust, but the average thrust is comparable.

Therefore, by making $D_1$ larger than the pitch A, it is possible to smooth the distribution of the permeance between the gaps, reduce the detent, and improve the thrust characteristics.

REFERENCE SIGNS LIST

1: conveying device, 21a, 21b: winding, 22a, 22b, 122: core, 25a, 25b, 25c, 125: electromagnet, 26: yoke, 30a, 30b:

current detection unit, 40: calculation unit, 50*a*, 50*b*: drive circuit, 55: power supply, 110: container carrier, 210: container holder, 212: carrier base, 214: sliding unit, 216: sliding surface, 218: permanent magnet, 220, 420: cover, 410*a*, 410*b*: mover, 421: side surrounding portion.

The invention claimed is:

1. A body-to-be-conveyed that is a component of a conveying device that uses electromagnetic force as thrust and can move in a horizontal direction, comprising:
    a mover in which a bottom surface is arranged so that a predetermined gap is formed in a vertical direction with respect to a sliding surface thereof, wherein
    the mover includes a permanent magnet and a cover,
    a gap facing surface of the permanent magnet facing the gap includes one magnetic pole,
    the cover is installed on a side of the permanent magnet opposite from the gap facing surface in the vertical direction,
    the horizontal outermost diameter of the cover is larger than the horizontal outermost diameter of the permanent magnet,
    the cover is formed of a flat plate and has a disk shape, and
    the lower surface of the cover is parallel to the sliding surface.

2. The body-to-be-conveyed according to claim 1, wherein
    the cover includes a recess on the surface on the gap side,
    the vertical dimension of the recess is smaller than the vertical dimension of the permanent magnet, and
    a part of the permanent magnet is embedded in the recess.

3. The body-to-be-conveyed according to claim 2, wherein
    the following inequality (3) is satisfied when the horizontal outermost diameter of the permanent magnet is $D_1$ and the horizontal outermost diameter of the cover is $D_2$.

$$1.0 < D_2/D_1 \quad (3)$$

4. The body-to-be-conveyed according to claim 1, wherein
    the cover is formed of a soft magnetic material.

5. The body-to-be-conveyed according to claim 1, wherein
    the cover is installed so as to directly contact the side of the permanent magnet opposite from the gap facing surface in the vertical direction.

6. The body-to-be-conveyed according to claim 1, wherein
    a sliding unit is provided on the gap facing surface of the mover.

7. The body-to-be-conveyed according to claim 1, comprising:
    a container holder for installing a specimen vessel, and
    a carrier base for supporting the container holder, wherein the carrier base includes the mover.

8. A conveying device comprising:
    a conveyance path on which a plurality of electromagnets are arranged;
    a power supply;
    a control unit; and
    a body-to-be-conveyed, wherein
    the device conveys the body-to-be-conveyed to a desired position using electromagnetic forces of the plurality of electromagnets as thrusts,
    the body-to-be-conveyed includes a mover in which a bottom surface is arranged so that a predetermined gap is formed in a vertical direction with respect to a sliding surface thereof,
    the mover includes a permanent magnet and a cover,
    the cover is installed on a side of the permanent magnet opposite from a gap facing surface facing the gap in the vertical direction,
    the horizontal outermost diameter of the cover is larger than the horizontal outermost diameter of the permanent magnet,
    the cover is formed of a flat plate and has a disk shape, and
    the lower surface of the cover is parallel to the sliding surface.

9. The conveying device according to claim 8, wherein
    the following inequality (1) is satisfied when the horizontal outermost diameter of the cover is $D_2$ and the pitch of the central axes of adjacent electromagnets among the plurality of electromagnets is A.

$$D_2/2 < A \quad (1)$$

10. The conveying device according to claim 8, wherein
    the cover includes a recess on a surface on the gap side,
    the vertical dimension of the recess is smaller than the vertical dimension of the permanent magnet, and
    a part of the permanent magnet is embedded in the recess.

11. The conveying device according to claim 8, wherein
    the cover is formed of a soft magnetic material.

12. The conveying device according to claim 8, wherein
    the cover is installed so as to directly contact the side of the permanent magnet opposite from the gap facing surface in the vertical direction.

13. The conveying device according to claim 8, wherein
    a sliding unit is provided on the gap facing surface of the mover.

14. The conveying device according to claim 8, wherein
    the following inequality (1) is satisfied when the horizontal outermost diameter of the cover is $D_2$ and the pitch of the central axes of adjacent electromagnets among the plurality of electromagnets is A.

$$D_2/2 < A \quad (1)$$

15. The conveying device according to claim 8, wherein
    the body-to-be-conveyed is a container carrier, and
    the container carrier includes:
    a container holder for installing a specimen vessel, and
    a carrier base for supporting the container holder, and
    the carrier base includes the mover.

16. The conveying device according to claim 8, wherein
    the following inequality (2) is satisfied when the horizontal outermost diameter of the permanent magnet is $D_1$ and the pitch of the center axes of adjacent electromagnets among the plurality of electromagnets is A.

$$0 < D_1/A \leq 1.5 \quad (2)$$

17. The conveying device according to claim 8, wherein
    the following inequality (3) is satisfied when the horizontal outermost diameter of the permanent magnet is $D_1$ and the horizontal outermost diameter of the cover is $D_2$.

$$1.0 < D_2/D_1 \quad (3).$$

* * * * *